United States Patent [19]

Wilkening et al.

[11] Patent Number: 5,753,274
[45] Date of Patent: May 19, 1998

[54] APPARATUS FOR PRODUCING A THREE-DIMENSIONAL OBJECT

[75] Inventors: Christian Wilkening, Diessen; Andreas Lohner, Haar, both of Germany

[73] Assignee: EOS GmbH Electronics Optical Systems, Planegg, Germany

[21] Appl. No.: 622,008

[22] Filed: Mar. 26, 1996

[30] Foreign Application Priority Data

Mar. 30, 1995 [DE] Germany .................. 195 11 772.7

[51] Int. Cl.⁶ .................................................. B29C 35/08
[52] U.S. Cl. ............... 425/174.4; 264/255; 264/401; 264/497; 425/470
[58] Field of Search ................. 425/174.4, 174.2, 425/470; 264/401, 497, 255, 308

[56] References Cited

U.S. PATENT DOCUMENTS

| | | | |
|---|---|---|---|
| 4,752,498 | 6/1988 | Fudim | 427/54.1 |
| 4,801,477 | 1/1989 | Fudim | 264/401 |
| 4,944,817 | 7/1990 | Bourell et al. | 264/497 |
| 5,011,635 | 4/1991 | Murphy et al. | 264/22 |
| 5,156,700 | 10/1992 | Berman et al. | 156/155 |
| 5,173,220 | 12/1992 | Reiff et al. | 264/22 |
| 5,460,758 | 10/1995 | Langer et al. | 264/497 |
| 5,500,069 | 3/1996 | Ogue et al. | 425/174.4 |
| 5,562,846 | 10/1996 | McKeen | 264/401 |

FOREIGN PATENT DOCUMENTS

| | | |
|---|---|---|
| 0 426 363 A2 | 8/1991 | European Pat. Off. . |
| 93 19 567.2 | 5/1994 | Germany . |
| 43 00 478 C1 | 8/1994 | Germany . |
| 2-128829 | 5/1990 | Japan . |
| 5-8305 | 1/1993 | Japan . |
| WO 92/08592 | 5/1992 | WIPO . |

*Primary Examiner*—Jay H. Woo
*Assistant Examiner*—Ivrie A. Schwartz
*Attorney, Agent, or Firm*—George W. Neuner

[57] ABSTRACT

An apparatus for producing a three-dimensional object by successive solidification of layers of a powder material at points corresponding to a cross-section of said object using electromagnetic or particle radiation comprises support means having an upper side for supporting the object thereon at a determined elevation, elevation adjustment means for varying the elevation, means for applying a layer of the material onto the upper side or onto another layer formed on the upper side, and irradiation means for irradiating the layer of the material at the points corresponding to a cross-section of the object. For reducing the production time of the object the apparatus further comprises a prefabricated base plate on the upper side, the base plate being made of a material which the powder material adheres to when being solidified, and means for removably connecting the base plate to the upper side of the support means.

31 Claims, 2 Drawing Sheets

APPARATUS FOR PRODUCING A THREE-DIMENSIONAL OBJECT

BACKGROUND OF THE INVENTION

The invention relates to an apparatus for producing a three-dimensional object by successive solidification of layers of a material. The invention further relates to a corresponding production method.

German Patent 43 00 478 discloses a method known as selective laser sintering for producing a three-dimensional object by successive solidification of layers of a powder material at points corresponding to a cross-section of the object using electromagnetic radiation and a corresponding apparatus for carrying out this method. In this known apparatus the object to be formed is constructed on a metallic platform which is part of the apparatus. However, the process of sintering or solidifying the layers of the object can not start with the first powder layer applied to the platform, because the solidified regions of this layer are not laterally supported and will therefore be displaced on the metallic platform when applying the following powder layer by means of a wiper used for applying the powder. Thus, usually at least one or better several powder layers are completely solidified using the laser beam to form a basis for the object. However, this complete solidification of the first layer applied to the metallic platform requires a long additional processing time which considerably increases the total production time of the object.

OBJECTS OF THE INVENTION

It is an object of the invention to provide an improved method and apparatus in which the above-mentioned drawback is avoided. It is a further object of the invention to modify the conventional method and apparatus so that the production time of the object is reduced.

SUMMARY OF THE INVENTION

According to the invention an apparatus for producing a three-dimensional object by successive solidification of layers of a powder material at points corresponding to a cross-section of the object using electromagnetic or particle radiation comprises support means having an upper side for supporting the object thereon at a determined elevation, a prefabricated base plate on the upper side, the base plate being made of a material which the powder material adheres to when being solidified, means for removably connecting the base plate to the upper side of the support means, elevation adjustment means for varying the elevation of the upper side, means for applying a layer of the material onto the upper side or onto another layer formed on the upper side, and irradiation means for irradiating the layer of the material at the points corresponding to a cross-section of the object.

BRIEF DESCRIPTION OF THE DRAWINGS

Further advantages, features and objects of the invention will be apparent from the following description of an exemplary embodiment with reference to the drawings. In the drawings

DESCRIPTION OF A PREFERRED EMBODIMENT

Figure 1:
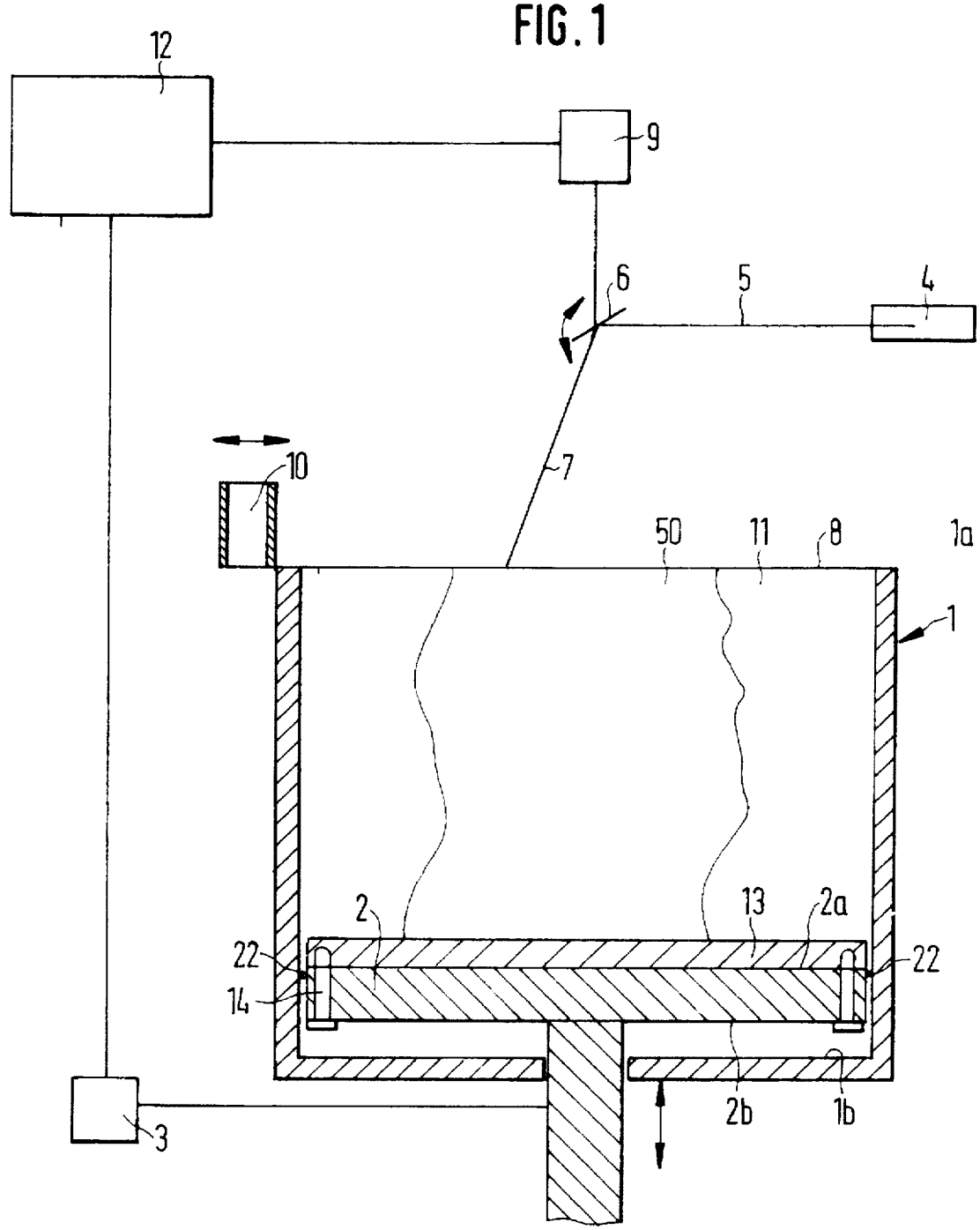
FIG. 1 shows a cross-sectional side view of the apparatus according to the invention in schematic representation.

As best shown in FIG. 1 the apparatus for producing a three-dimensional object comprises a container 1 having an open top and an object support 2 mounted within the container 1 for vertical displacement by means of an elevation adjustment device 3. The object support 2 is formed as a plate extending parallel to an upper edge 1a of the container for supporting the object 50 to be formed. The horizontal dimensions of the object support 2 are slightly smaller than the corresponding cross-section of the interior of the container 1 so that the object support 2 can smoothly slide within the container 1. The gap between the edge of the object support 2 and the inner wall of the container 1 is sealed by a flexible sealing lip 22 surrounding the outer edge of the object support 2.

A prefabricated plate 13 made of a solidified building material is arranged on the upper side 2a of the object support 2 facing the open top of the container 1. The plate 13 serves as a base for the object 50 to be formed and is connected to the object support 2 through bolts 14 engaging threaded bores provided in the bottom side of the plate 13 facing the object support 2. The size of the plate 13 corresponds to the size of the object support 2. Moreover, the plate 13 is mounted on the object support 2 in such a manner that it extends parallel to the upper edge 1a of the container.

Figure 2:
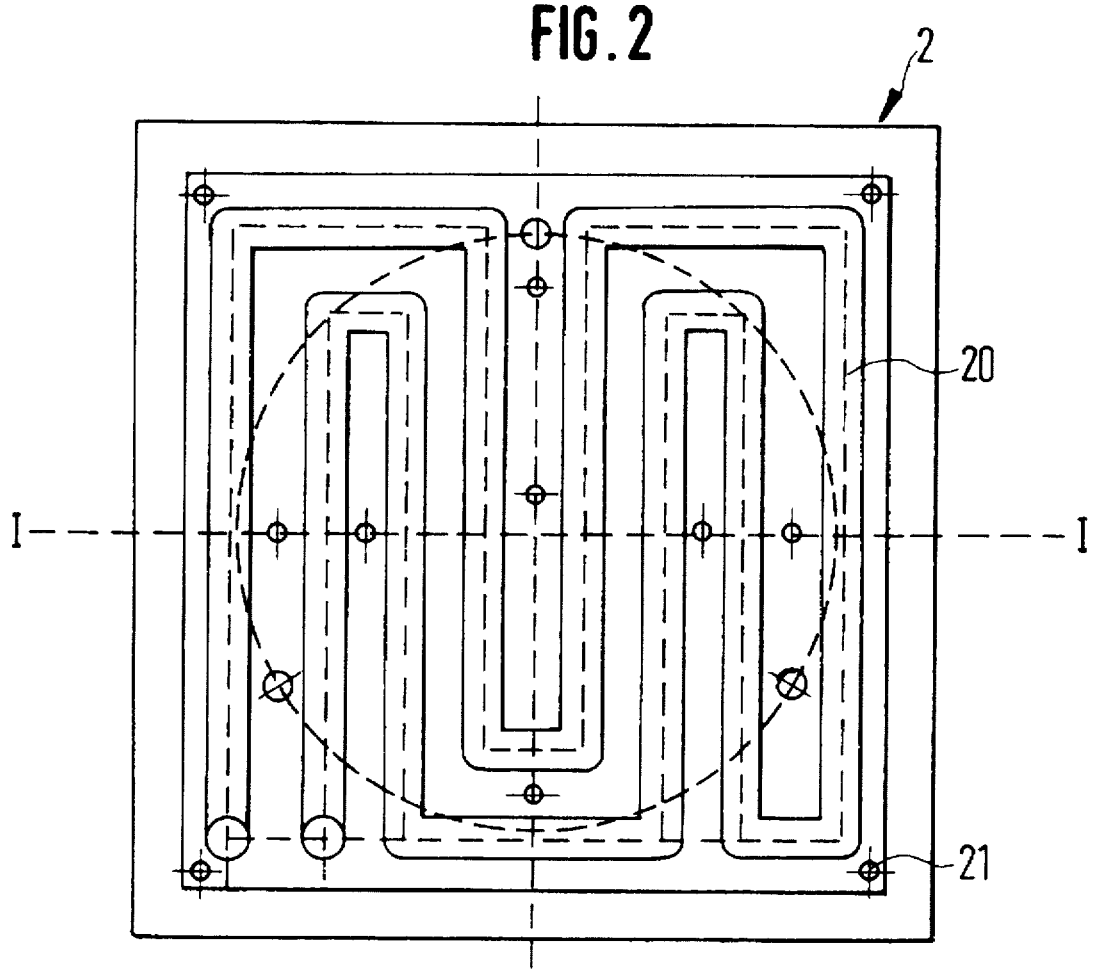
FIG. 2 is a bottom view of an embodiment of the object support means 2 shown in FIG. 1.
Figure 3:
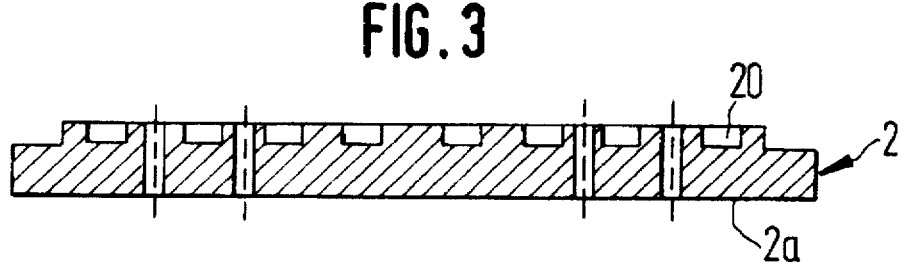
FIG. 3 is a cross-section of the object support means taken along line I—I in FIG. 2.

As best shown in the FIGS. 2 and 3 a cooling conduit 20 formed with meandering loops receiving a copper tube for cooling water is formed in the bottom surface 2b of the object support 2 facing the bottom 1b of the container. The object support 2 further comprises a plurality of bores 21 receiving the bolts 14 connecting the object support 2 with the presintered plate 13.

In the described embodiment the container 1, the object support 2 and the presintered plate 13 all have a square cross-section. However, this cross-section may also be circular or rectangular or have an arbitrary shape.

The object support 2 is made of a metal having good heat conductive properties, for example aluminum. The presintered plate 13 is made of the same building material which is used for forming the object 50. Preferably, the building material consists of metal powder, ceramic powder, resin coated metal or ceramic powder or resin coated sand.

An irradiation device 4 formed as a laser delivering a directed light beam 5 is arranged above the container 1. A deflection device 6, for example a rotating mirror, focuses the light beam 5 as a deflected beam 7 onto the working plane 8 defined by the upper edge 1a of the container. A control device 9 controls the deflection device 6 so as to direct the deflected beam 7 onto any desired point within the working plane 8.

A device 10 for applying a uniform layer of a powderous material 11 which can be solidified by action of electromagnetic radiation can be moved horizontally across the working plane 8 and parallel thereto. The applying device 10 is for example formed as a combination of a reservoir with a wiper for applying and smoothing the layer.

The elevation adjustment device 3 and the control device 9 for the irradiation device 4 are both connected with a central control unit 12 formed as a processor for controlling the devices in a coordinated manner.

In the inventive method a first step is to produce the plate 13 by solidifying or sintering the corresponding building material under heat action in an oven.

In a following step the object support 2 is moved in direction towards the open top of the container 1 and out of the container up to a stop so that the presintered plate 13 can easily be mounted at the object support 2. Thereupon the plate 13 is screwed to the object support 2.

In a following step the object support is lowered to a position wherein the upper side of the presintered plate 13 is below the upper edge 1a of the container by an amount corresponding to the thickness of a layer. Thereupon a first layer of the material 11 is applied to the plate 13 by means of the applying device 10 and smoothed using the wiper. The control unit 12 then controls the deflection device 6 through the control device 9 thereof in such a manner that the deflected light beam 7 strikes those points of the material layer which shall be solidified according to the coordinates of the object 50 as stored in the control unit 12. In this way the material is solidified or sintered, resp., at these points. Preferably, the irradiation of the first powder layer is carried out a second time to create a solid connection between the presintered plate 13 and the first layer of the object 50. Since the plate 13 consists of the same material as the object 50, the first layer of the object when solidified perfectly adheres to the plate 13.

In a following step the object carrier 2 is lowered by an amount corresponding to the thickness of the following layer and a second material layer is applied by means of the applying device 10 and again smoothed and solidified.

The steps of applying the material, smoothing and solidifying the material are carried out a number of times required for completing the object 50 to be produced. Since the laser power required in particular for sintering metal powder is between 100 and 200 W, the object 50 is considerably heated. Peak temperatures of 900° C. at the sintering point and average temperatures of the object of around 200° C. are possible. This may produce oxidation of the building material. For this reason the object support 2 is cooled during the entire building process. Since the building materials used generally have a good heat conductivity, the object 50 or the entire container 1 with the material 11 therein, resp., can be kept at constant temperature.

After completing the building process the object support 2 is lifted to protrude from the top of the container and the presintered plate 13 together with the object 50 formed thereon is unscrewed. Subsequently the object 50 is separated from the plate 13 using a saw and post-processed.

Besides of the reduction of production time, the use of the presintered plate 13 of sintered building material is advantageous in that it provides a stable basis for the first layers of the object. This means that a curl or deformation, resp., of the object is reduced.

Modifications of the described process are possible. Typically, the described metal sintering device is used for building mold insets. In case the mold inset has a plane base surface, the presintered plate 13 will form part of the sintered object. The plate 13 is adapted to the corresponding object by post-processing steps. This is for example done using a piercing saw for cutting the plate 13 to the correct size. In this case the presintered plate can not be used in a next building process.

In case that the mold inset to be produced has no plane base surface, first a support construction is formed on the presintered plate 13 and subsequently the object is constructed. After the forming process the object is separated from the presintered plate at the support construction. The separation can be facilitated by a suitable choice of predetermined breaking points in the support construction. In this case the presintered plate can be reused in another building process after a pretreatment, for example by filing the surface.

In place of the plate 13 consisting of only solidified building material a metal plate, in particular a steel plate, may be used which has one or several layers of the solidifiable material applied and solidified or sintered, resp., thereon.

Although the invention has been described with reference to a specific example embodiment, it is to be understood that it is intended to cover all modifications and equivalents within the scope and spirit of the appended claims.

What is claimed is:

1. Apparatus for producing a three-dimensional object by successive solidification of layers of a powder material at points corresponding to a cross-section of said object using electromagnetic or particle radiation, said apparatus comprising:

an opening defined by peripheral walls having a top surface;

a support having an upper surface for supporting the object positioned within said opening;

elevation adjustment means for varying the elevation of said upper surface;

means for applying a layer of said powder material onto said upper surface or onto a solidified layer of said material formed on said upper surface; and irradiation means positioned above said top surface for irradiating said layer of said powder material at said points corresponding to a cross-section of said object;

said support comprising a removable base plate comprising a presolidified amount of a powder material wherein said upper surface is on said removable base plate;

wherein said elevation means positions the upper surface, or a solidified layer of said material formed on said upper surface, below the top surface by an amount equal to the layer of powder material to be applied.

2. The apparatus of claim 1, wherein said removable base plate has a size corresponding to that of said support.

3. The apparatus of claim 1 wherein said support comprises a plate.

4. The apparatus of claim 1, comprising cooling means formed in said support for removing heat produced in said object and in said base plate when producing said object.

5. The apparatus of claim 4, said cooling means comprising cooling channels formed in said support on a side thereof opposite to said object.

6. The apparatus of claim 1, wherein said removable base plate is connected to said support using fastening means.

7. The apparatus of claim 1, wherein said irradiation means comprises a laser.

8. The apparatus of claim 1, wherein said powder material comprises metal powder, ceramic powder, resin coated metal or ceramic powder or resin coated sand.

9. The apparatus of claim 1, wherein said removable base plate comprises a metal plate having at least one solidified layer of said powder material formed thereon, said metal plate facing the upper side of said support.

10. Apparatus for producing a three-dimensional object by successive solidification of layers of a powder material at points corresponding to a cross-section of said object using electromagnetic or particle radiation, said apparatus comprising:

an opening defined by peripheral walls having a top surface;

a support having an upper surface for supporting the object positioned within said opening;

elevation adjustment means for varying the elevation of said upper surface;

means for applying a layer of said powder material onto said upper surface or onto a solidified layer of said material formed on said upper surface; and irradiation means positioned above said top surface for irradiating said layer of said powder material at said points corresponding to a cross-section of said object;

said support comprising a removable base plate having a surface layer that is a presolidified amount of a powder material wherein said upper surface is said surface layer;

wherein said elevation means positions the upper surface, or a solidified layer of said material formed on said upper surface, below the top surface by an amount equal to the layer of powder material to be applied.

11. The apparatus of claim 10, wherein said removable base plate has a size corresponding to that of said support.

12. The apparatus of claim 10, wherein said support comprises a plate.

13. The apparatus of claim 10, comprising cooling means formed in said support for removing heat produced in said object and in said base plate when producing said object.

14. The apparatus of claim 13, said cooling means comprising cooling channels formed in said support on a side thereof opposite to said object.

15. The apparatus of claim 10, wherein said removable base plate is connected to said support using fastening means.

16. The apparatus of claim 10, wherein said irradiation means comprises a laser.

17. The apparatus of claim 10, wherein said powder material comprises metal powder, ceramic powder, resin coated metal or ceramic powder or resin coated sand.

18. The apparatus of claim 10, wherein said removable base plate comprises a metal plate having at least one solidified layer of said powder material formed thereon, said metal plate facing the upper side of said support.

19. Apparatus for producing a three-dimensional object by successive solidification of layers of a powder material at points corresponding to a cross-section of said object using electromagnetic or particle radiation, said apparatus comprising:

an opening defined by peripheral walls having a top surface;

a support having an upper surface for supporting the object positioned within said opening;

elevation adjustment means for varying the elevation of said upper surface;

means for applying a layer of said powder material onto said upper surface or onto a solidified layer of said material formed on said upper surface; and irradiation means positioned above said top surface for irradiating said layer of said powder material at said points corresponding to a cross-section of said object;

said support comprising a removable base plate having a surface layer that provides adherence for said object to said base plate;

wherein said elevation means positions the upper surface, or a solidified layer of said material formed on said upper surface, below the top surface by an amount equal to the layer of powder material to be applied.

20. The apparatus of claim 19, wherein said removable base plate has a size corresponding to that of said support.

21. The apparatus of claim 19, wherein said support comprises a plate.

22. The apparatus of claim 19, comprising cooling means formed in said support for removing heat produced in said object and in said base plate when producing said object.

23. The apparatus of claim 22, said cooling means comprising cooling channels formed in said support on a side thereof opposite to said object.

24. The apparatus of claim 19, wherein said removable base plate is connected to said support using fastening means.

25. The apparatus of claim 19, wherein said irradiation means comprises a laser.

26. The apparatus of claim 19, wherein said powder material comprises metal powder, ceramic powder, resin coated metal or ceramic powder or resin coated sand.

27. The apparatus of claim 19, wherein said removable base plate comprises a metal plate having at least one solidified layer of said powder material formed thereon, said metal plate facing the upper side of said support.

28. A removable base plate for use in an apparatus for producing a three-dimensional object by successive solidification of layers of a powder material at points corresponding to a cross-section of said object using electromagnetic or particle radiation, said apparatus comprising (i) an opening defined by peripheral walls having a top surface, (ii) a support cooperating with said removable base plate to provide an upper surface for supporting the object positioned within said opening, (iii) elevation adjustment means for varying the elevation of said upper surface, (iv) means for applying a layer of said powder material onto said upper surface or onto a solidified layer of said material formed on said upper surface, and (v) irradiation means positioned above said top surface for irradiating said layer of said powder material at said points corresponding to a cross-section of said object, said removable base plate comprising a metal plate having thereon a presolidified amount of a powder material wherein said upper surface is on said removable base plate;

wherein said elevation means positions the upper surface, or a solidified layer of said material formed on said upper surface, below the top surface by an amount equal to the layer of powder material to be applied.

29. The removable base plate of claim 28, wherein said layer of said powder material is sintered onto an upper surface of said metal plate.

30. A removable base plate for use in an apparatus for producing a three-dimensional object by successive solidification of layers of a powder material at points corresponding to a cross-section of said object using electromagnetic or particle radiation, said apparatus comprising (i) an opening defined by peripheral walls having a top surface, (ii) a support cooperating with said removable base plate to provide an upper surface for supporting the object positioned within said opening, (iii) elevation adjustment means for varying the elevation of said upper surface, (iv) means for applying a layer of said powder material onto said upper surface or onto a solidified layer of said material formed on said upper surface, and (v) irradiation means positioned above said top surface for irradiating said layer of said powder material at said points corresponding to a cross-section of said object, said removable base plate having a surface layer that is a presolidified amount of a powder material wherein said upper surface is said surface layer;

wherein said elevation means positions the upper surface, or a solidified layer of said material formed on said upper surface, below the top surface by an amount equal to the layer of powder material to be applied.

31. A removable base plate for use in an apparatus for producing a three-dimensional object by successive solidification of layers of a powder material at points corresponding to a cross-section of said object using electromagnetic or particle radiation, said apparatus comprising (i) an opening defined by peripheral walls having a top surface, (ii) a support cooperating with said removable base plate to provide an upper surface for supporting the object positioned within said opening, (iii) elevation adjustment means for varying the elevation of said upper surface, (iv) means for applying a layer of said powder material onto said upper surface or onto a solidified layer of said material formed on said upper surface, and (v) irradiation means positioned above said top surface for irradiating said layer of said powder material at said points corresponding to a cross-section of said object, said removable base plate having a surface layer that provides adherence for said object to said base plate;

wherein said elevation means positions the upper surface, or a solidified layer of said material formed on said upper surface, below the top surface by an amount equal to the layer of powder material to be applied.

* * * * *

UNITED STATES PATENT AND TRADEMARK OFFICE
CERTIFICATE OF CORRECTION

PATENT NO. : 5,753,274
DATED : May 19, 1998
INVENTOR(S) : C. Wilkening
A. Lohner It is certified that error appears in the above-indentified patent and that said Letters Patent is hereby corrected as shown below:

Item

[73] Assignee: Please change "EOS GmbH Electronics Optical Systems " to-- EOS GmbH Electro Optical Systems--

Signed and Sealed this

Eleventh Day of August 1998

Attest:

BRUCE LEHMAN

Attesting Officer

Commissioner of Patents and Trademarks